US008554131B2

(12) United States Patent
Lee et al.

(10) Patent No.: US 8,554,131 B2
(45) Date of Patent: Oct. 8, 2013

(54) ENHANCED NOTIFICATION MECHANISM FOR BROADCAST NETWORKS USING BIT-MAP VECTORS

(75) Inventors: Jangwon Lee, San Diego, CA (US); An Mei Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1252 days.

(21) Appl. No.: 12/168,493

(22) Filed: Jul. 7, 2008

(65) Prior Publication Data

US 2010/0003914 A1 Jan. 7, 2010

(51) Int. Cl.
*H04H 20/71* (2008.01)
*H04H 60/09* (2008.01)
*H04H 40/00* (2008.01)

(52) U.S. Cl.
USPC ........................ 455/3.01; 455/3.03; 455/3.06

(58) Field of Classification Search
USPC ................ 455/3.01, 3.02, 414.3, 3.06, 180.1, 455/567
See application file for complete search history.

(56) References Cited

U.S. PATENT DOCUMENTS

| | | | |
|---|---|---|---|
| 5,909,651 A * | 6/1999 | Chander et al. ............... | 455/466 |
| 6,088,577 A * | 7/2000 | Yang et al. .................... | 340/7.57 |
| 6,606,502 B1 * | 8/2003 | Chung Kam Chung et al. ............................. | 455/466 |
| 6,725,022 B1 * | 4/2004 | Clayton et al. ............. | 455/154.1 |
| 7,330,693 B1 * | 2/2008 | Goss ............................. | 455/3.01 |
| 7,493,079 B2 * | 2/2009 | Koizume et al. ............. | 455/3.06 |
| 7,536,189 B2 * | 5/2009 | Himmelstein ............. | 455/456.1 |
| 7,596,391 B2 * | 9/2009 | Himmelstein ............. | 455/569.2 |
| 7,599,715 B2 * | 10/2009 | Himmelstein ............. | 455/562.1 |
| 7,620,363 B2 * | 11/2009 | Spurgat et al. ................ | 455/3.05 |
| 7,643,788 B2 * | 1/2010 | Habaguchi et al. .......... | 455/3.03 |
| 7,747,291 B2 * | 6/2010 | Himmelstein ............. | 455/569.2 |
| 7,765,235 B2 * | 7/2010 | Day et al. ...................... | 707/795 |
| 7,783,304 B2 * | 8/2010 | Himmelstein ............. | 455/456.1 |
| 7,885,685 B2 * | 2/2011 | Himmelstein ............. | 455/556.1 |
| 7,907,976 B2 * | 3/2011 | Himmelstein ............. | 455/569.2 |
| 7,965,992 B2 * | 6/2011 | Habaguchi et al. ........ | 455/152.1 |
| 8,032,072 B2 * | 10/2011 | Thibodeau et al. .......... | 455/3.01 |

(Continued)

FOREIGN PATENT DOCUMENTS

| | | |
|---|---|---|
| EP | 1475969 | 11/2004 |
| EP | 1921776 | 5/2008 |
| WO | 2007083824 | 7/2007 |

OTHER PUBLICATIONS

Invitation to Pay Additional Fees—PCT/US2009/049705 International Search Authority—European Patent Office—Nov. 3, 2009.

(Continued)

*Primary Examiner* — Tilahun B Gesesse
(74) *Attorney, Agent, or Firm* — Fulbright & Jaworski LLP

(57) ABSTRACT

Methods, apparatus, systems and computer program products are defined for enhancing the delivery of overhead notifications in a broadcast network, in particular a broadcast network suitable for wireless device implementation. The broadcast-receiving devices only receive new notification messages, as opposed to receiving all of the currently active notification messages. This is achieved by broadcasting a listing of the currently active notifications versions and having the devices compare the currently active notification versions to the locally stored version(s) to determine which version or versions require capturing. In those aspects in which the broadcast-receiving device is a battery powered wireless device, battery power consumption is minimized because the device only captures active notification messages not currently in device memory, as opposed to all of the currently active notifications.

47 Claims, 15 Drawing Sheets

(56) References Cited

U.S. PATENT DOCUMENTS

| | | |
|---|---|---|
| 8,135,336 B2 * | 3/2012 | Nawata .............................. 455/7 |
| 8,224,346 B2 * | 7/2012 | Himmelstein ............. 455/456.1 |
| 2006/0040610 A1 * | 2/2006 | Kangas ......................... 455/3.06 |
| 2007/0042757 A1 * | 2/2007 | Jung et al. .................. 455/412.2 |
| 2007/0183744 A1 * | 8/2007 | Koizumi et al. ................. 386/83 |
| 2008/0107057 A1 | 5/2008 | Kannan et al. |
| 2008/0108376 A1 | 5/2008 | Chen et al. |

OTHER PUBLICATIONS

International Search Report, PCT/US2009/049705, International Searching Authority, European Patent Office, May 17, 2010.

Written Opinion, PCT/US2009/049705, International Searching Authority, European Patent Office, May 17, 2010.

\* cited by examiner

ENHANCED NOTIFICATION MECHANISM FOR BROADCAST NETWORKS USING BIT-MAP VECTORS

BACKGROUND

Background

Large-scale deployment of mass media services/media objects over wireless communication networks may utilize broadcast/multicast network capabilities. Multimedia Broadcast and Multicast Service (MBMS) and Broadcast and Multicast Service (BCMCS), as proposed by telecommunications specifications-setting projects, such as the $3^{rd}$. Generation Partnership Project (3GPP) and $3^{rd}$. Generation Partnership Project 2. (3GPP2), as well as, MediaFLO™ technology as developed and available from Qualcomm Incorporated of San Diego, Calif., are targeted towards enabling multimedia content transfer to handheld communication devices over the wireless channel. The MediaFLO™ broadcast network provides services that allow transfer of media objects, such as digital movie clips, sports broadcasts, video clips and music files. Additionally, other broadcast technologies have been implemented globally, for example, Digital Video Broadcasting-Handheld (DVB-H) has gained acceptance in Europe, Integrated Services Digital Broadcast-Terrestrial (I-SDB-T) has been standardized in Japan, and Digital Multimedia Broadcasting (DMB) has been adopted in China.

FIG. 1 provides for a block diagram illustrating the services 10 provided in a broadcast network particularly suited for wireless delivery, such as MediaFLO™ or the like, in accordance with the prior art. The service may include real time services 20, such as news, sporting events or the like, non-real time services 30, such as pre-recorded programming and the like, and IP datacast services 40, such as news, weather, stock quotes, and the like. In addition to real time services 20, non-real time service 30 and IP datacast services 40 the broadcast network provides for a common overhead service 50 for broadcasting overhead information. Unlike real time services 20, non-real time service 30 and IP datacast services 40, the common overhead service 50 does not carry any media content. Instead, the common overhead service is responsible for broadcasting overhead information that is essential for a device to properly receive the other services. For example, the overhead information provides for informing the media content-receiving devices of system events, state, status and system information and to assist the devices in accessing the other services. In this regard, the overhead service 50 includes a primary flow/channel 52, a notification flow/channel 54, a plurality of system information flows/channels 56 and a configuration flow 58.

The system information flows 56 may include a marketplace for offering the device user service subscription options, such as games, movies, programs and the like, a Media Presentation Guide (MPG), service information and the like. In general, the system information flows 56 assist device users in subscribing to services and viewing content. The configuration flow 58 broadcasts necessary configuration messages that include configuration settings used by the devices to receive the media content delivered by the other services. The notification flow 54 may include various types of notification messages, such as service alerts, client application upgrades and the like. The primary flow 52, which the device listens for on a frequent basis, such as every five minutes or the like, indicates whether the notification, system information and/or configuration information broadcasted by their respective flows have been updated. If the primary flow indicates an update, the device tunes to the respective individual flow channel associated with the update and updates the associated overhead information.

In current broadcast networks, the primary message delivered via the primary flow 52 includes two fields related to the notification flow. The first field is a notification version identifier that indicates the current version of the notification. If a device's local notification version differs from the notification version in the primary flow message, the device needs to tune to the notification channel and listen to the notification flow. The second field is the number of notifications field that indicates the number of notifications associated with the current notification version. If a device determines that it needs to receive a notification update because the notification version in the primary message is higher than the current local notification version, then the device will tune to the notification flow channel to collect the number of notifications indicated in the number of notification field.

FIG. 2 provides an example of the formatting of a notification message in the notification flow, in accordance with the prior art. The notification message 60 includes a notification version block 70, a notification ID block 80, a composite address block 90 and a notification record block 100. The notification version block 70 indicates the version of the notification flow data that the message corresponds to. The notification ID block 80 uniquely identifies a notification message among notification messages of a particular notification version. The composite address block 90 additionally includes an address class sub-block 92 and an address sub-block 94 that indicate the set of devices to which the notification is relevant. For example, the address may be a service ID, a package ID or the like. The notification record block 100 further includes a notification type sub-block 102, a message compression type sub-block 104 and the notification detail sub-block 106, which provides the actual notification message.

A problem exists in the current notification process implemented in wireless broadcast systems, in that, devices are forced to receive all of the active notifications being broadcasted wherever there is a change/update of the notification version. By unnecessary acquiring all of the active notifications, as opposed to only those newer notifications that the device does not possess, the device must listen for longer periods of time to capture all of the messages and, thus battery power is inefficiently consumed.

FIGS. 3 and 4 provide an example of the current notification process as implemented in wireless broadcast systems, according to the prior art. FIG. 3 illustrates a first notification version designated in the primary flow message 110 in the notification version block 112 as version twenty (20). The primary flow message 110 also includes a number notification block 114 that indicates that ten (10) active notifications are associated with version twenty (20). Therefore, in the notification flow ten notification messages 60-0-60-9 are being broadcasted for version twenty (20), with the version being indicated in the notification version block 70 and the notification identifier, zero-nine (0-9), being indicated in the notification ID block 80.

FIG. 4 illustrates a second notification version designated in the primary flow message 110 in the notification version block 112 as version twenty-one (21). The primary flow message 110 also includes the number notification block 114 that indicates that eleven (11) active notifications are associated with version twenty-one (21), thus, in this example, one additional notification has been added to the notification flow. As such, the network device(s) responsible for generating and communicating the overhead messages, updates the primary flow message 110 to indicate in the notification version block 112, the updated version twenty-one (21) and the number notification block 114 is updated to reflect eleven notifications active in version twenty-one (21). Additionally, all of the messages 60-0-60-10 in the notification flow are updated, such that the notification version block 70 indicates version twenty-one (21) and the notification ID block 80 indicates the identifier individually associated with each of the eleven (11) notifications in version twenty-one (21).

From the broadcast-receiving device side, once the device detects, in the primary message, a change in notification version from version twenty (20) to version twenty-one (21), the device will tune to the notification flow and capture all eleven (11) notifications associated with version twenty-one (21). As previously noted, the device needs to capture all eleven (11) active notifications regardless of how many active notifications in version twenty-one (21) the device previously captured and stores with respect to previous versions. The need to capture all of the active notifications in the current version consumes unnecessary device power if the device already possesses notifications associated with a previous version. The battery power consumption problem becomes more evident in instances in which a large number of active notifications exist in the notification flow or if a high churn/turnover rate exists amongst the active notifications (e.g., notification versions are frequently changing due to frequent adding or removal of notifications).

Therefore, a need exists to develop a notification process in broadcast networks that serves to minimize notification acquisition time and, thus, minimize power consumption in devices that receive the broadcast service, in particular, wireless devices that operate on battery power limitations.

BRIEF DESCRIPTION OF THE DRAWINGS

The disclosed aspects will hereinafter be described in conjunction with the appended drawings, provided to illustrate and not to limit the disclosed aspects, wherein like designations denote the elements, and in which.

DETAILED DESCRIPTION

Figure 1:
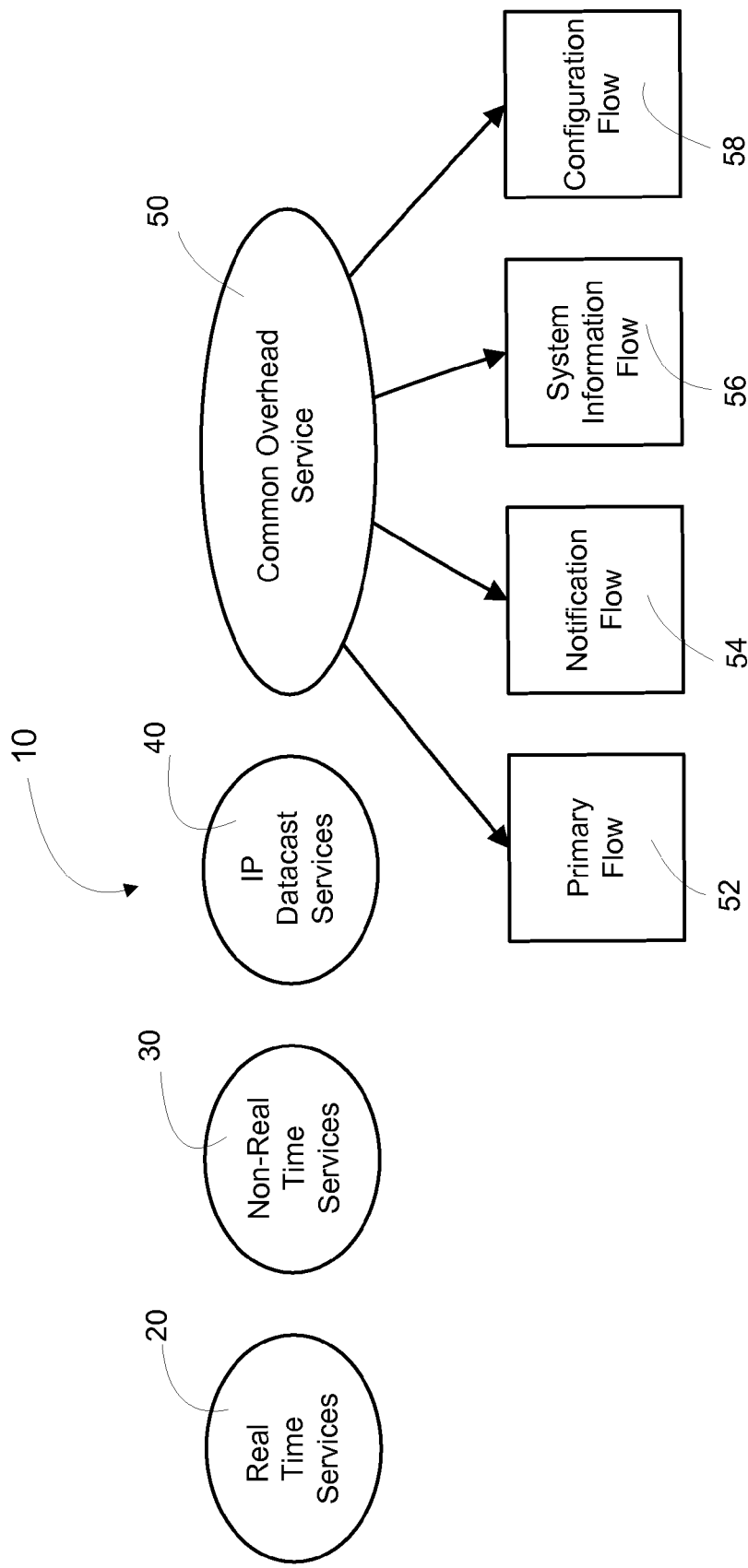
FIG. 1 is a block diagram of the services provided by a broadcast network and, in particular the flows provided by an overhead service in a broadcast network, according to the prior art.
Figure 2:
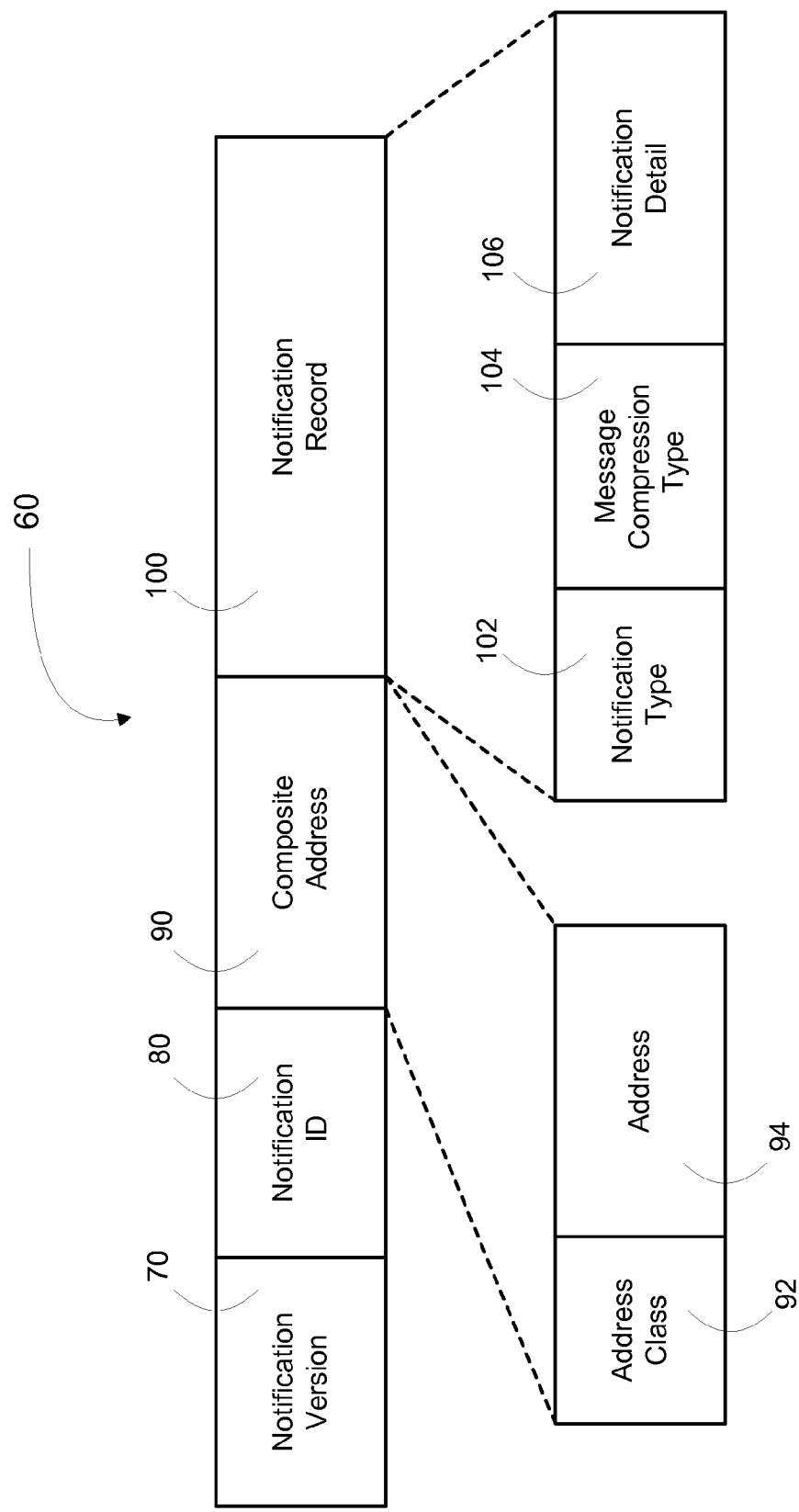
FIG. 2 is block diagram depiction of the formatting of a notification message in an overhead service of a broadcast network, in accordance with the prior art.
Figure 3:
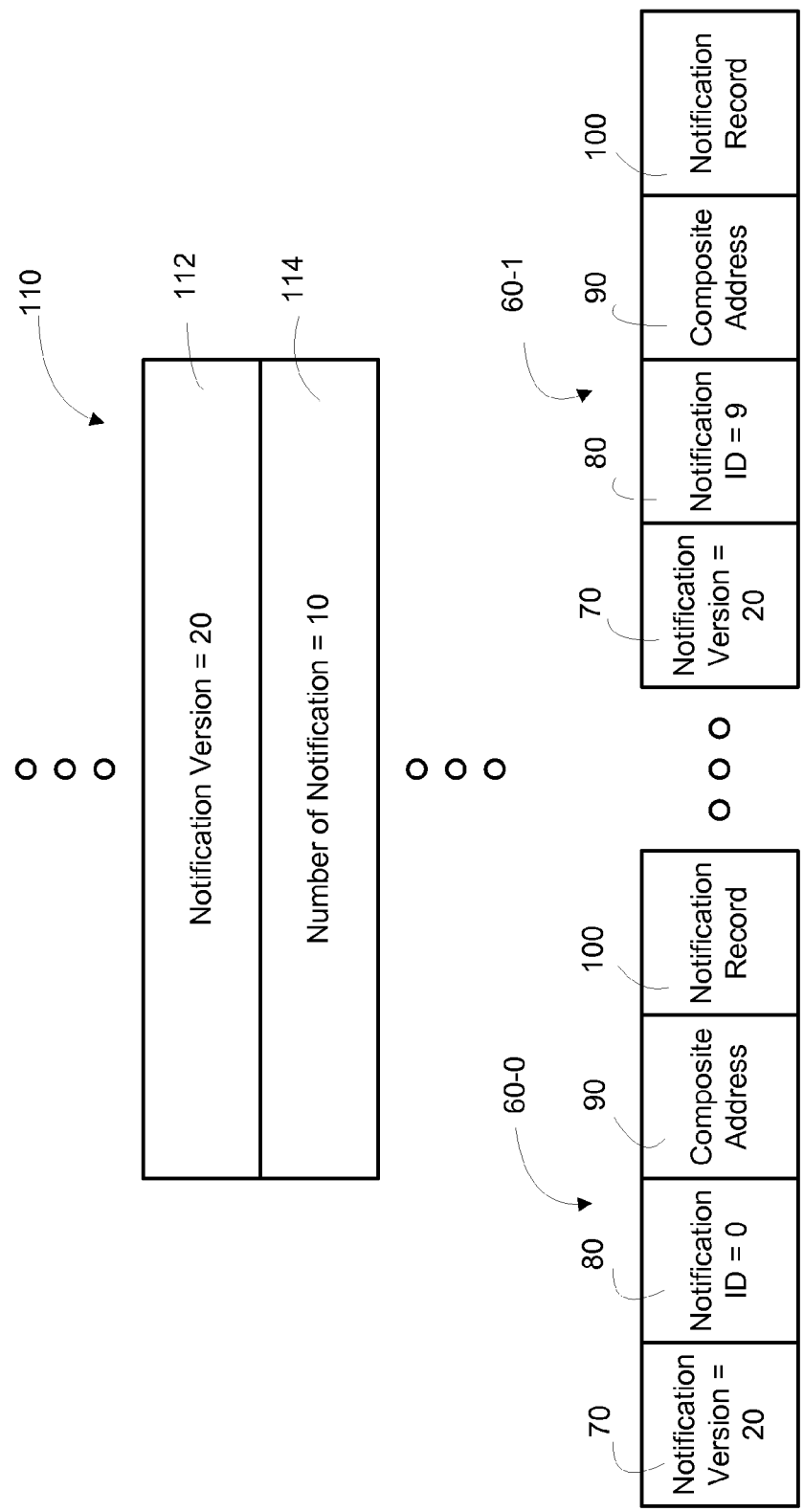
FIG. 3 is a block diagram depiction of an exemplary primary message and a corresponding notification version including notification messages, in accordance with the prior art.
Figure 4:
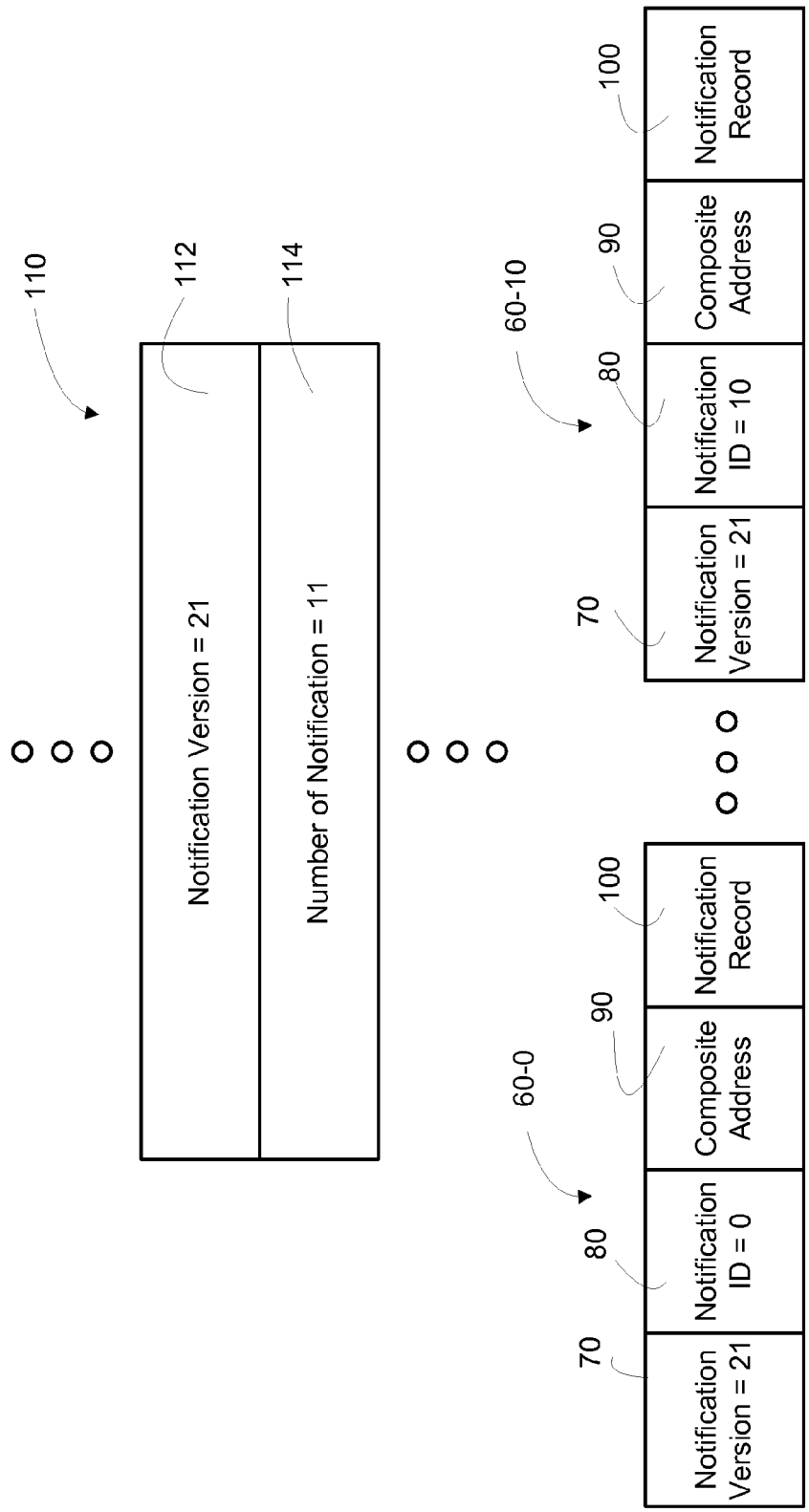
FIG. 4 is a block diagram illustration of another exemplary primary message and a corresponding notification version including notification messages, in accordance with the prior art.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Thus, methods, apparatus, systems and computer program products are defined for enhancing the delivery of overhead notifications in a broadcast network, in particular a broadcast network suitable for wireless device implementation. In accordance with present aspects, the broadcast-receiving devices only receive new notification messages, as opposed to receiving all of the currently active notification messages. This is achieved by broadcasting a listing of the currently active notifications versions, such as in a primary notification message, and having the devices compare the currently active notification versions to the locally stored version(s) to determine which version or versions require capturing. In one innovative aspect the primary notification message implements a bit vector map to indicate which of the notification versions are currently active.

In those aspects in which the broadcast-receiving device is a battery powered wireless device, battery power consumption is minimized because the device only captures active notification messages not currently in device memory, as opposed to all of the currently active notifications. Thus, the wireless device only listens to the notification flow when those active but not currently locally stored notification versions are being broadcasted.

Figure 5:
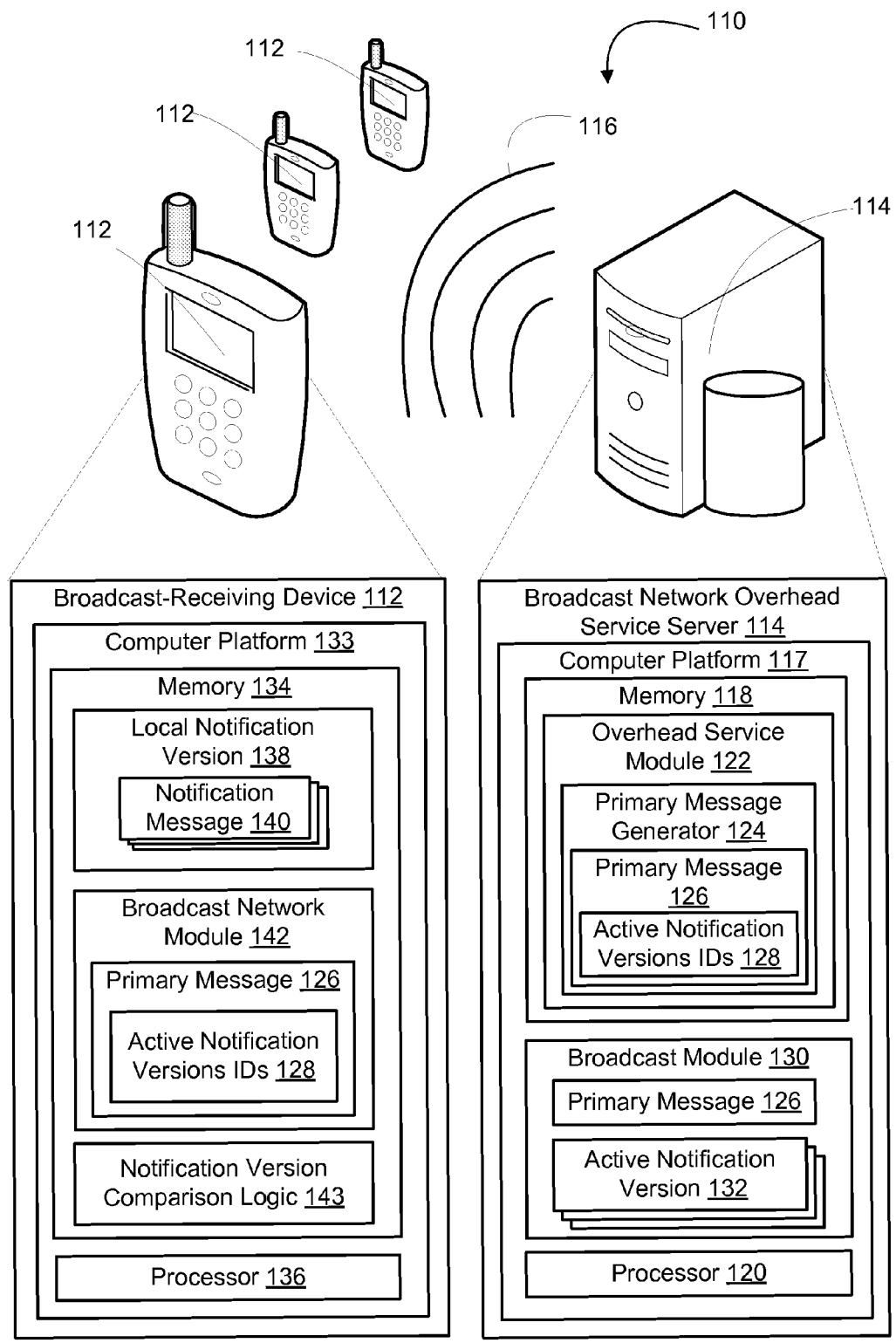
FIG. 5 is a block diagram of a system for enhanced overhead notification delivery in a broadcast network, according to a described aspect.

Referring to FIG. 5, a block diagram is provided of a system 110 for enhanced overhead notification message delivery in a broadcast network, in accordance with present aspects. The system comprises plurality of broadcast-receiving devices 112, such as wireless devices and a broadcast network overhead service server 114 that is in broadcast communication with the broadcast-receiving devices 112 through a broadcast network 116, such as the MediaFLO™ broadcast network, available from QUALCOMM Inc, of San Diego Calif. The system herein described is especially suited for wireless devices acting as the broadcast receiving devices 112 because the system provides for less capturing of notifications and, thus less power consumption in battery powered wireless devices. Additionally, it should be noted that while server 114 is depicted in FIG. 1 as a single server, in many aspects of system 110 the functions associated with server 114 will be accomplished by more than one network device, entity, server, module or the like.

The broadcast network overhead service server 114 includes a computer platform 117 having a memory 118 and a processor 120 in communication with the memory 118. The memory includes an overhead service module 122 operable for generating overhead messages for distribution in the broadcast network, such as, but not limited to, primary messages, notification messages, system information messages, configuration messages and the like. Thus, according to present aspects, the overhead service module 122 includes a primary message generator 124 operable to generate a primary message 126 that includes active notification version identifiers (IDs) 128, which serve to identify the active notification versions that are currently being broadcasted in the broadcast network.

In one or more aspects, as described in more detail below, the primary message 126 may optionally indicate the active notification versions through implementation of a bit map vector (not shown in FIG. 5). In such aspects, each bit in the bit map vector corresponds to a notification version, such that a bit that is set corresponds to an active notification version. In those aspects that implement a bit map vector to indicate active notification versions, the bit map size may limit the range of active notification version numbers. Thus, to accommodate notification messages associated with an active notification version outside of the bit-size range of the bit map vector, notification messages from the version outside of the range may be merged into an active notification inside of the bit size range. For further discussion of this aspect, see FIGS. 8-10 and the related discussion.

The broadcast network overhead service server 114 additionally includes a broadcast module 130 operable to broadcast the messages generated by overhead service module 122. Thus, in accordance with present aspects the broadcast module 130 will broadcast the primary message 126 across a primary channel (not shown in FIG. 5) or the like for the purpose of informing the broadcast-receiving devices of the currently active notification versions. Additionally, the broadcast module 130 will broadcast the active notification versions 132, each of which include one or more notification messages, across a notification channel (not shown in FIG. 5) or the like.

The broadcast-receiving device 112 includes computer platform 133 having a memory 134 and a processor 136 in communication with the memory 134. The memory includes a local notification version 138 that includes a plurality of notification messages 140. In most instances, the local notification version 138 will coincide with the highest numbered notification version of a previously captured notification version. Thus each time an active notification version is captured, and the captured notification version reflects a higher version number, the local notification version number will be updated to reflect the higher number. The notification messages 140 included in the local notification version 138 will include all of the notifications messages associated with all of the notification versions captured by the broadcast-receiving device 112.

The memory 134 of broadcast-receiving device 112 additionally includes a broadcast network module 142 operable to capture broadcasted content, including overhead service messages. As such, the broadcast network module 140 is operable to capture primary message 126 broadcasted over primary channel (not shown in FIG. 5) or the like. In one aspect, the broadcast-receiving device may periodically awaken (e.g., once every five (5) minutes) to listen to the primary channel and capture the primary message 126. As described in conjunction with the primary message generator 124 of the overhead service server 114, the primary message will include active notification version identifiers (IDs) 128 operable to identify the active notification versions currently being broadcasted in the broadcast network 116. As previously noted, the primary message 126 may optionally indicate the active notification versions through implementation of a bit map vector (not shown in FIG. 5).

The memory 134 of broadcast-receiving device 112 additionally includes notification version comparison logic 143 operable to compare an identifier associated with the local notification version 138 to the active notification version identifiers 128 to determine which, if any, notification versions require capturing by the broadcast-receiving device 112. In one aspect, the comparison may include comparing the local notification version number to the active notification version numbers to determine if any of active notification version numbers are higher than the local notification version number. In this regard, if any of the active notification version numbers are determined to be higher than the local notification version number, then the higher numbered active notification version numbers are captured from within the notification flow and the local version number is updated to reflect the highest numbered active notification version that is captured.

Figure 6:
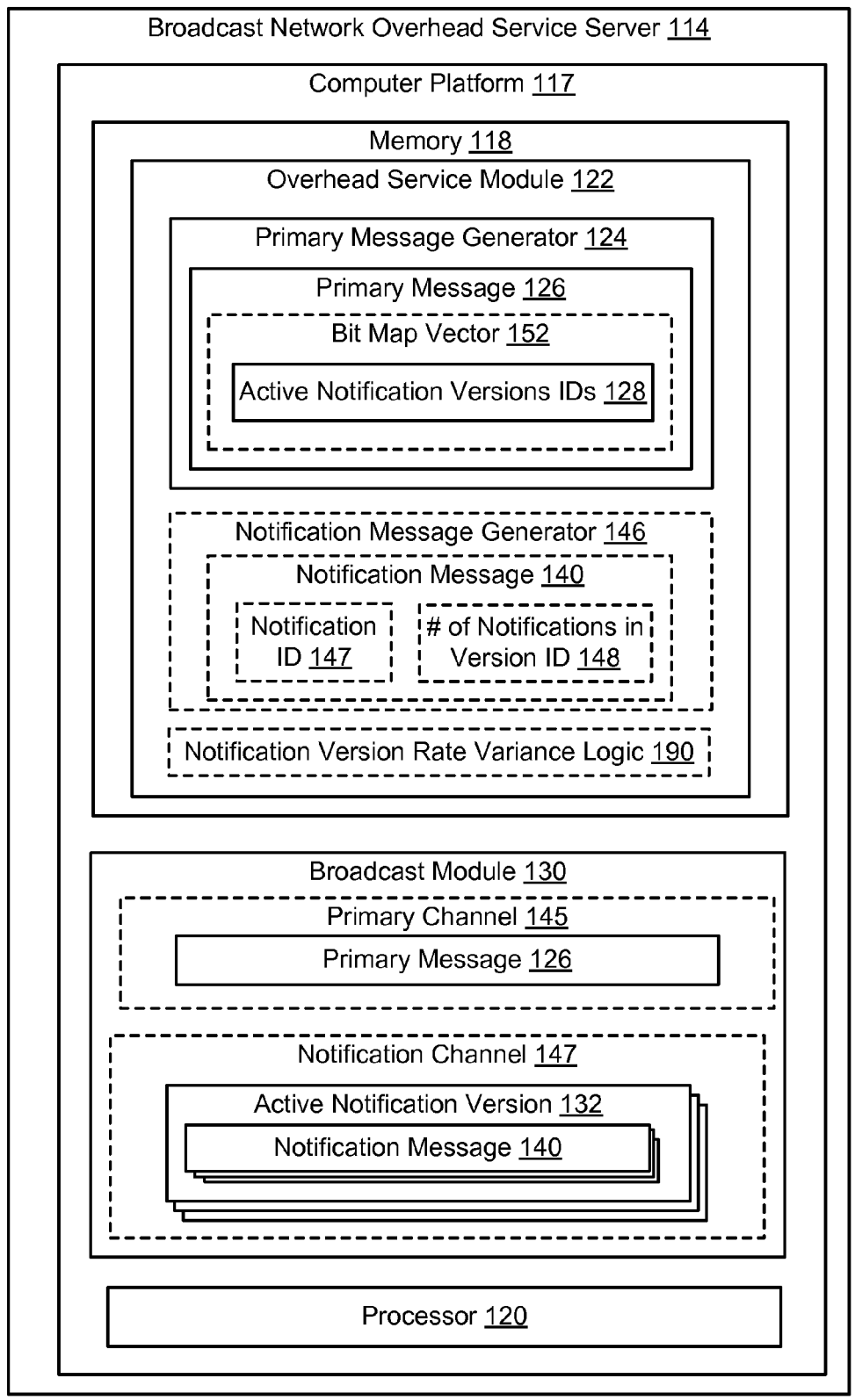
FIG. 6 is a block diagram detailing an overhead server in a broadcast network for generating and communicating primary messages indicating active notification versions, according to a described aspect.

Referring to FIG. 6, a more detailed block diagram of a broadcast network overhead service server 114 is depicted, highlighting optional aspects. As previously noted, the overhead service module 122 includes a primary message generator 124 that is operable to generate a primary message 126. The primary message 126 includes active notification version identifiers 128. In some aspects, the active notification version identifiers 128 are included in a bit map vector 152 by setting a bit in the bit map vector that corresponds to an active notification version.

In addition to the primary message generator 124, the overhead service module 122 may optionally include a notification message generator 146 operable to generate one or more notification messages 140. Each notification version 132 that is broadcasted includes one or more notification messages 140. In accordance with present aspects, the notification messages may include a notification identifier 147 and a number of notifications in version identifier 148. The notification identifier 147 identifies the notification in the version and the number of notifications in version identifier 148 indicates the number of messages included within the corresponding notification version. For example, 1/10, 2/10,. etc., where "1" and "2" are the notification identifier 147 and "10" is the number of notifications in version identifier 148. In this regard, the broadcast-receiving device 112 is able to determine the number of notification messages in a notification version and, thus, determine when the capture of the notification version is complete. By knowing when the capture process is complete, the device is able to efficiently move from a broadcast-receiving listen mode to a sleep mode, thereby further limiting battery power consumption.

In certain optional aspects, the overhead service module 122 may include notification version broadcast rate variance logic 190 operable to vary the rate at which active notification versions 132 are broadcasted. In some aspects, the broadcast rate may be varied based on the age of the notification version, as such, later-in-time, e.g., more recent, versions may be broadcasted more frequently while previous-in-time, e.g., less recent, versions may be broadcasted less frequently. Verifying the rate of broadcast based on the age of the versions uses the assumption that most broadcast-receiving devices will have previously captured the older versions and only requires capturing of the newer versions. By broadcasting the more recent active notification versions more frequently, a device that tunes to the notification channel is more likely to capture the required active notification versions in a shorter period of time than if all of the active versions are broadcasted at the same rate. If the broadcast-receiving device is able to capture the notification versions in a shorter period of time, less time is spent listening to the broadcast channel and, therefore, in the case of wireless devices, less battery power may be consumed.

Additionally, as previously noted, the broadcast module 130 is operable to broadcast the primary message 126 and the active notification version(s) 132 that include one or more notification messages 140. In some aspects, the broadcast module 130 may broadcast the primary message 126 across a dedicated primary channel 145 and the active notification versions 132 across a dedicated notification channel 147. However, in other aspects, the primary message and/or the active notification versions may be broadcasted over other broadcast channels, including the same channel.

Figure 7:
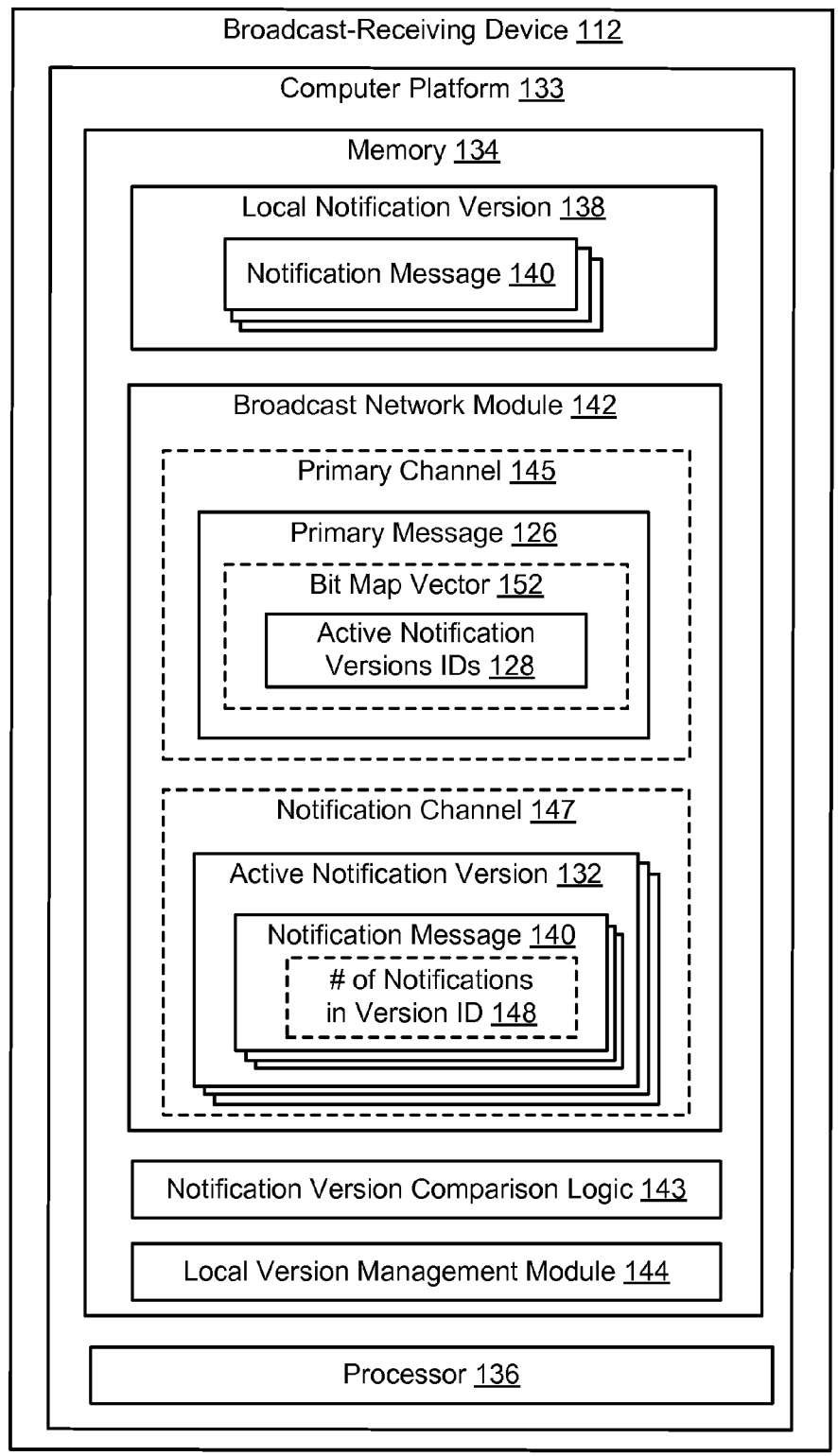
FIG. 7 is a block diagram illustrating an broadcast-receiving device for capturing enhanced overhead notification delivery, according to a described aspect.

Referring to FIG. 7, a more detailed block diagram of a broadcast-receiving device 112 is depicted, highlighting optional aspects. As previously noted, the broadcast-receiving device stores a local notification version 138 and all of the notifications 140 associated with the local notification version 138.

The broadcast network module 142 is operable to receive the broadcast of the primary message 126. In some aspects, the primary message may be captured by tuning the broadcast receptor to primary channel 145, if the primary message is broadcasted on primary channel 145. The primary message 126 includes active notification version identifiers 128. As previously noted, in some aspects, the active notification version identifiers 128 are included in a bit map vector 152 as indicated by setting a corresponding bit in the bit map vector.

The broadcast-receiving device implements the notification version comparison logic 143 to determine which, if any, active notifications versions 132 require capturing. The logic 143 compares the local notification version 138 to the active notification versions identified in the primary message 126 to make the capture determination. If capture of active notification version(s) 132 is warranted, the active notification version(s) may be captured by tuning the broadcast receptor to notification channel 147, if the notification versions are broadcasted on a dedicated notification channel 147. As previously discussed the notification messages 140 may include a number of notifications identifier 148 that indicates the number of messages included within the corresponding notification version. In this regard, the broadcast-receiving device 112 is able to determine the number of notification messages in a notification version and, thus, determine when the capture of the notification version is complete.

Once the capture is complete the local version management module 144 of broadcast-receiving device 112 updates the local notification version 138 to reflect the highest numbered active notification version captured. If the broadcast-receiving device 112 is unable to capture all of the active notification versions requiring capture or any of the notifications within an active notification version requiring capture, then the local notification version 138 remains the same as before the capture process to insure that the active notifications requiring capture are captured in subsequent broadcasts. The broadcast-receiving device 112 may be unable to capture notification versions if the broadcast signal is interrupted, the device has insufficient battery power, the device unexpectantly powers down, or the like. For example, assume the broadcast-receiving device 112 indicates a local notification version 13 and a determination is made that the device requires capture of active notification versions 14, 18 and 19. If the device is only able to capture all of notification version 19, seven of eight notifications included in notification version 14, and none of the notifications in notification version 18, then the local notification version remains at 13 and the broadcasting receiving device will subsequently listen for and capture active notification versions 14 and 18. In this instance, the device may be configured to bypass the acquisition/capture of active notification version 20, since active notification version 20 was previously captured and the associated notifications are currently stored in device memory.

Figure 8:
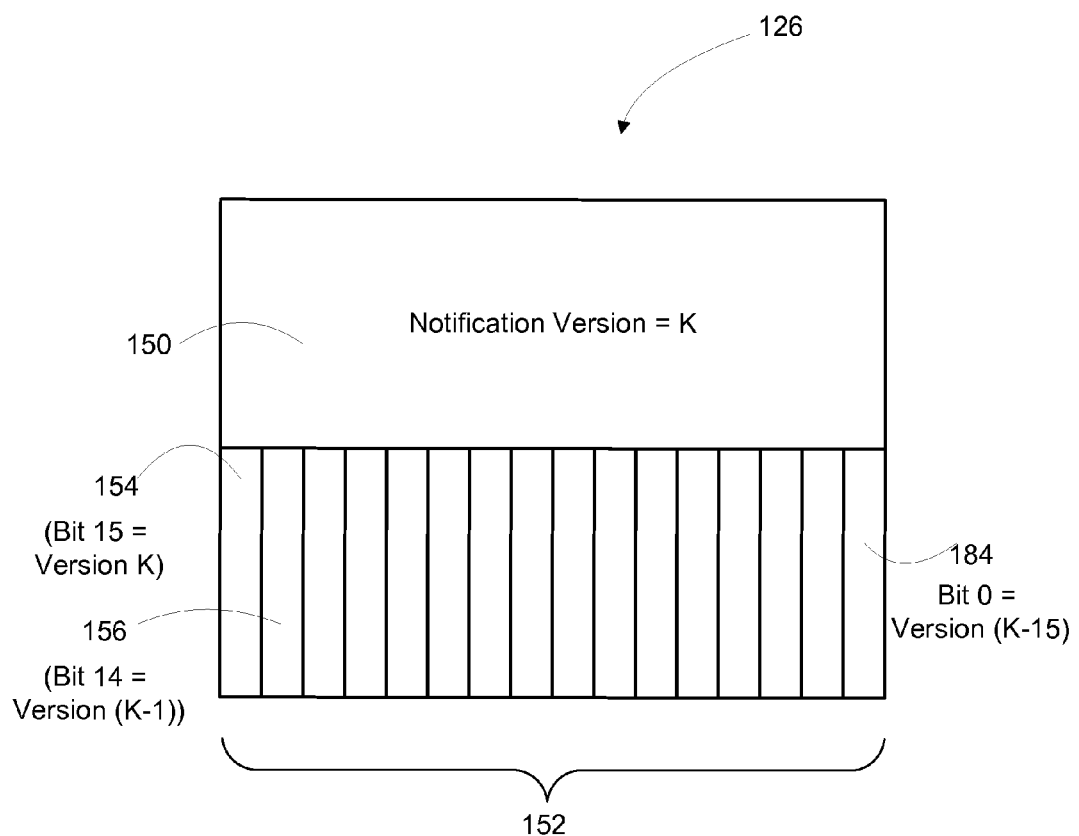
FIG. 8 is an example of a primary message including a bit map vector, according a described aspect.

FIG. 8 is an exemplary primary message 126 implementing a bit map vector to identify the active notification versions, in accordance with an aspect. The primary message 126 includes a notification version field 150 that indicates the most current notification version. In the example provided by FIG. 8 the most current notification version is designated as "K". The primary message also includes a bit map vector field 152. In the illustrated version of FIG. 8 the bit map vector 152 includes 16bits. The 16-bit size bit map vector is generally implemented to limit the size of the primary message 126. However, other bit map vector sizes, such as 32-bit, 64-bit or the like, may also be implemented without departing from the innovative concepts herein disclosed.

Each bit map in the bit map vector has a mapping relationship with a notification version. In the illustrated example of FIG. 8, "K" is the most current notification version and "N" is designated as the number of bits of the bit map vector. Bit (N−1), otherwise referred to as the most significant bit, is associated with the most current notification version. Thus, in the illustrated example in which the bit map vector is 16 bits, Bit 15 154 (e.g., (N−1) or (16−1)) is associated with notification version "K". Bit 14 156 (e.g., (N−2) or (16−2) is associated with the notification version (K−1) and so on. The least significant bit in the bit map vector, Bit 0 184 (e.g., (N−16) or (16−16)) is associated with the notification version (K−15).

Figure 9:
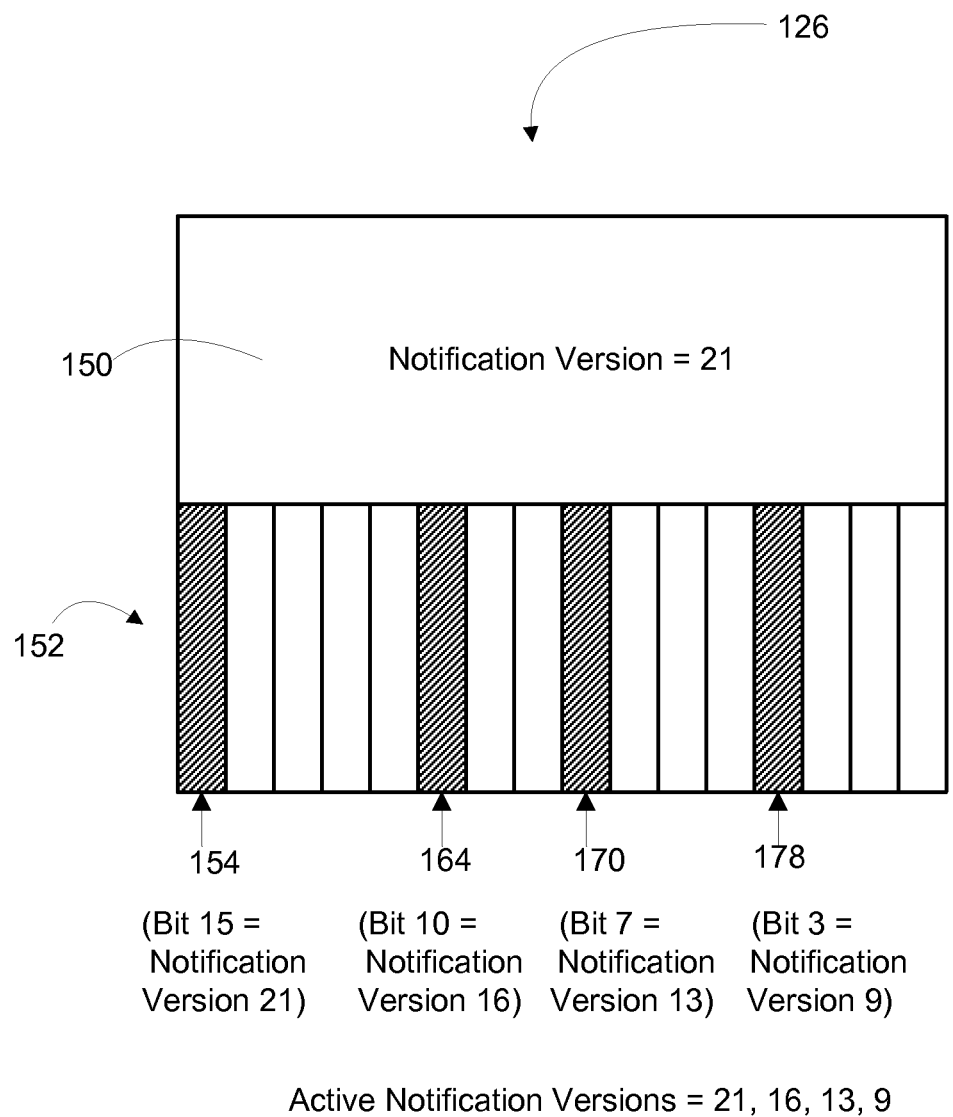
FIG. 9 is an example of a primary message including a bit map vector in which bits have been set to indicate active notification versions, according to another aspect.

FIG. 9 illustrates an exemplary primary message 126 in which bits have been set to identify currently active notification versions. As noted in the notification version field 150, the most current notification version is version 21.. Thus, the most significant bit in the 16-bit bit map vector 152, bit 15 154 is set to "1" (as indicated by the shading of the bit 15 block) to represent that notification version 21 is active over the notification broadcast channel. If a bit is set to "0", it represents that a notification version is not active. In alternate aspects, the bit could be set to "0" to indicate an active notification version and set to "1" to indicate an inactive notification version. In addition to setting bit 15 154 to "1" to indicate that notification version is active, three other bits have been set to "1" to indicate the three other active notification versions currently being broadcasted. Bit 10 164 is set to "1" to represent that notification version 16 is active, bit 7 170 is set to "1" to represent that notification version 13 is active and bit 3 178 is set is set to "1" to represent that notification version 9 is active. Thus, in the illustrated example if FIG. 9, notification versions other than 21, 16, 13 and 8, specifically notification versions 1-8, 10-12, 14, 15, and 17-20 are not active notification versions and, therefore the bits corresponding to these versions are not set to "1".

Figure 10:
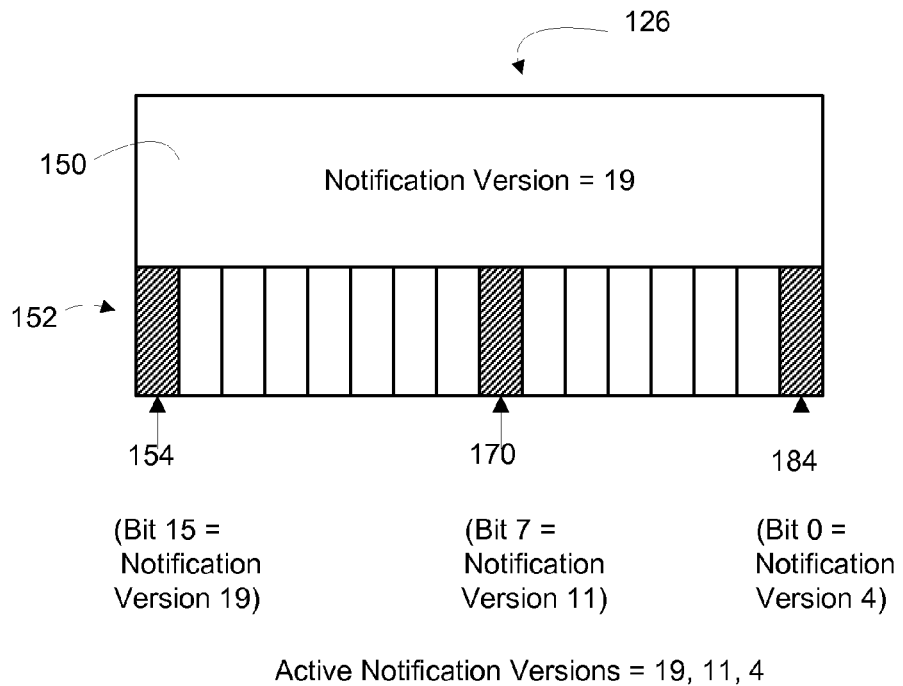
FIGS. 10-12 are examples of primary messages including a bit map vector illustrating the case in which merging of active notifications into a most recent notification version is required due to limitations in the range of active notification versions that can be indicating in the bit map vector due to the size of the bit map vector, according to yet another aspect.
Figure 11:
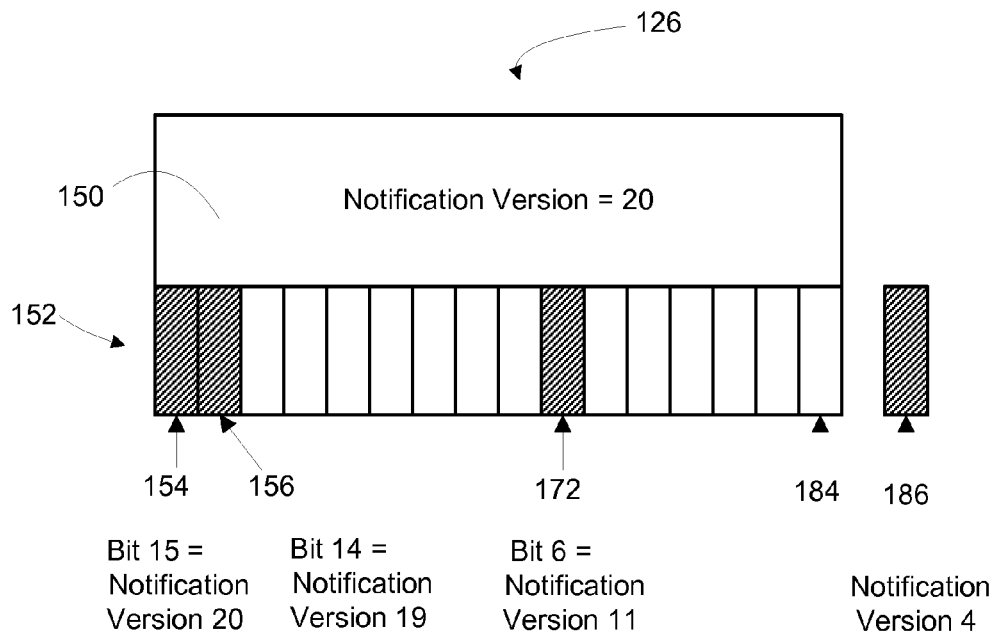
Figure 12:
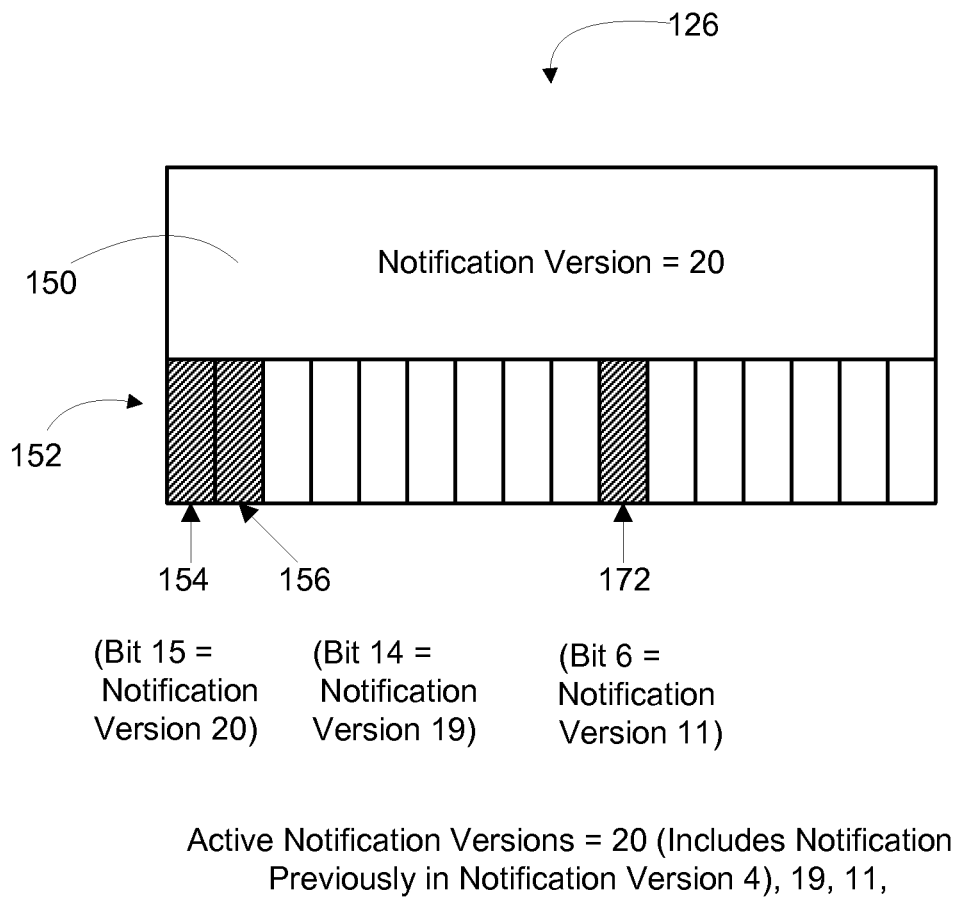

FIGS. 10-12 illustrate an example of notification version merge processing that is undertaken if an active notification version number is outside of the range accommodated by the bit map vector, according to another aspect. Referring to FIG. 10, the primary message 126 indicates in the notification version field 150 that the most current notification version is notification version 19. The bit map vector field 152 has bits set to "1" for bit 15 154, bit 7 170 and bit 0 184 to indicate that notification versions 19, 11 and 4 are the currently active notification versions.

Referring to FIG. 11, a new version has been added that warrants updating of the primary message 126. Specifically, the new notification version is designated as notification version number 20, as indicated in the notification version field 150. The currently active notification versions are notification versions 10, 19, 11, and 4. The bit map vector field 152 has bits set to "1" for bit 15 154, bit 14 156 and bit 6 172 to indicate that notification versions 20, 19 and 11 are active. However, the 16-bit size bit map vector does not provide enough bits to represent notification version 4 as being active. This because the lowest numbered version that can be represented in the bit map vector field 152 of FIG. 11 is notification version 5 in bit 0 184. In order for notification version 4 to be represented in bit map vector field 152, the bit map size would have to larger than 16 bits to accommodate additional bit 186. As previously noted, while larger sized bit maps are feasible they tend to add to the size of the primary message and therefore are not preferred in broadcast systems, especially broadcast systems in which the receiving devices are wireless devices, in which the goal is to minimize message size so as to shorten the length of time required to listen and capture the message.

In accordance with present aspects, notification messages associated with an active notification version that can no longer be reflected in the bit map vector due to bit map size constraints may be merged into a current active version. Thus, as shown in FIG. 12, since the 16-bit size bit map vector could not reflect notification version 4, the notification messages that are associated with notification version 4 are merged into notification version 20. In other words, notification version 20 includes the new notifications that warranted the update to notification version 20, as well as, the notifications previously associated with notification version 4. As shown in FIG. 12, the primary message 126 indicates notification version 20 in the notification version field 150. The bit map vector field 152 has bits set to "1" for bit 15 154, bit 14 156 and bit 6 172 to indicate that notification versions 20, 19 and 11 are active. Version 20 including the new notifications and the notification previously associated with notification version 4.

Figure 13:
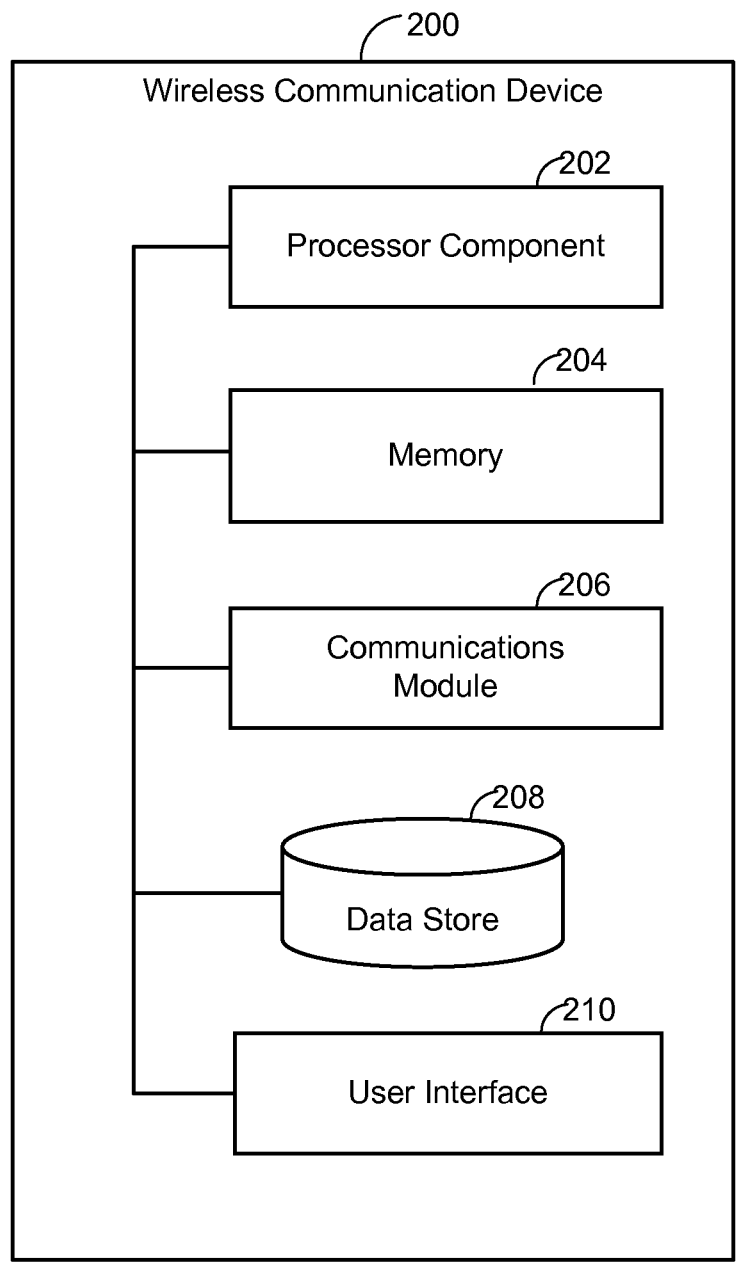
FIG. 13 is high-level block diagram of a wireless communication device, according to a described aspect in which the broadcast-receiving device comprises a wireless communication device.

Referring to FIG. 13, in one aspect, the broadcast-receiving device 112 may comprise a wireless communications device 200, such as a mobile communication device operable on a wireless communication system. As can be appreciated, in addition to providing broadcast-receiving capabilities the wireless communication device 200 provides for wireless communication via one or more of a variety of wireless communication systems, which often employ different spectrum bandwidths and/or different air interface technologies. Exemplary systems include CDMA (CDMA 2000, EV DO, WCDMA), OFDM, or OFDMA (Flash-OFDM, 802.20,. WiMAX), FDMA/TDMA (GSM) systems using FDD or TDD licensed spectrums, peer-to-peer (e.g., mobile-to-mobile) ad hoc network systems often using unpaired unlicensed spectrums, and 802.xx wireless LAN or BLUETOOTH techniques.

Wireless communications device 200 includes processor component 202 for carrying out processing functions associated with one or more of components and functions described herein. Processor component 202 can include a single or multiple sets of processors or multi-core processors. Moreover, processing component 202 can be implemented as an integrated processing system and/or a distributed processing system.

Wireless communications device 200 further includes a memory 204, such as for storing local versions of applications being executed by processor component 202. Memory 204 can include random access memory (RAM), read only memory (ROM), and a combination thereof. Additionally, in some aspects (not shown in FIG. 13), memory 204 includes broadcast network module 140 and notification version comparison logic 142

Further, wireless communications device 12 includes a communications component 206 that provides for establishing and maintaining communications with one or more parties utilizing hardware, software, and services as described herein. Communications component 206 may carry communications between components on wireless communications device 200, as well as between wireless communications device 200 and external network devices, such as devices located across a communications network and/or devices serially or locally connected to wireless communications device 200. For example, communications component 206 may include components necessary to receive broadcast communications from broadcast network 118 (not shown in FIG. 13).

Additionally, wireless communications device 12 may further include a data store 208, which can be any suitable combination of hardware and/or software that provides for mass storage of information, databases, and programs employed in connection with aspects described herein. Optionally, in some aspects, data store 208 may include local notification version 138 and corresponding notification messages 140 (not shown in FIG. 13).

Wireless communications device 200 may additionally include a user interface component 210 operable to receive inputs from a user of wireless communications device 200, and to generate outputs for presentation to the user. User interface component 210 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 210 may include one or more output devices, including but not limited to a display, a speaker, a haptic feedback mechanism, a printer, any other mechanism capable of presenting an output to a user, or any combination thereof. In accordance with present aspects, the interface component 210 may include requisite inputs for launching notification messages 140, and displays for displaying notification messages 140. None of the specific interface components are shown in FIG. 13 for the sake of brevity.

Figure 14:
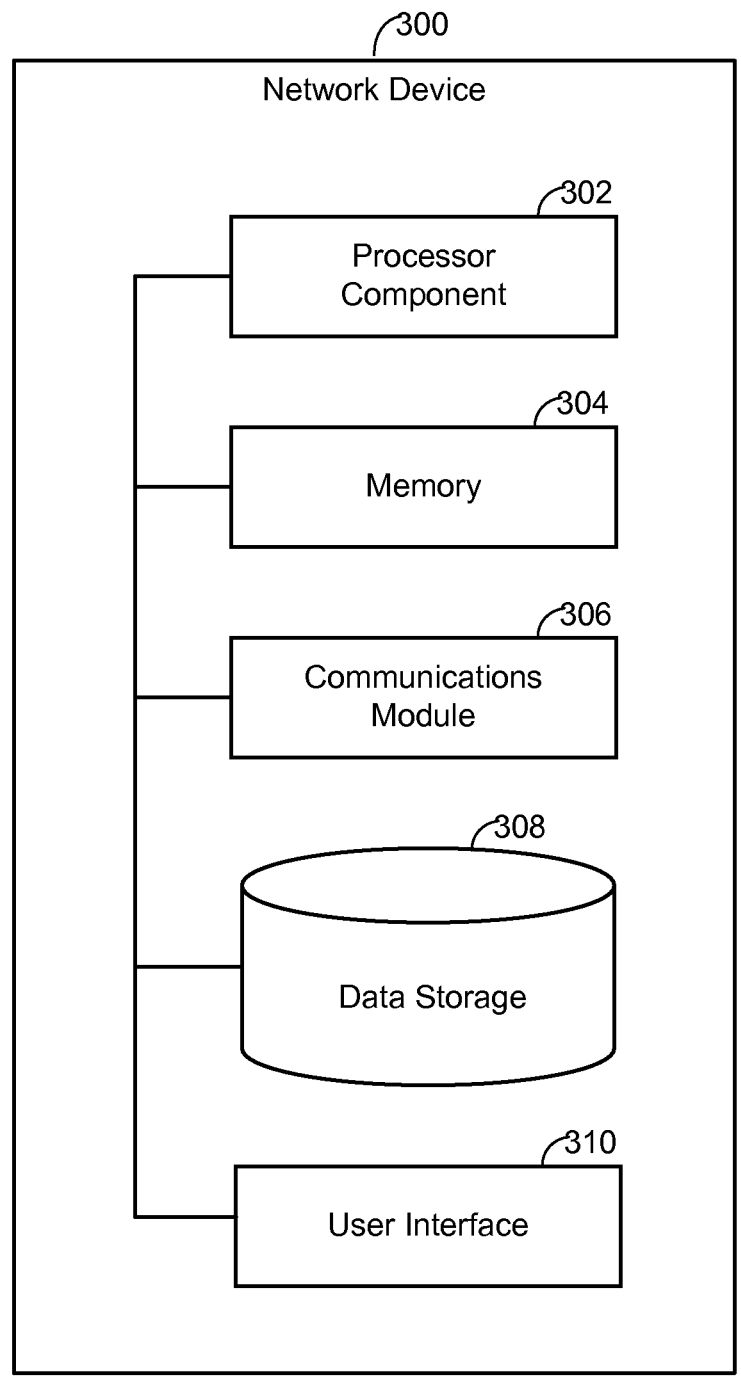
FIG. 14 is a high-level block diagram of a network device, such as an overhead service server, according to another aspect.

Referring to FIG. 14, in one aspect, the broadcast network overhead service server may comprise a network device 300. Network device 300 includes any type of network-based communication device, such as a network server operable on a communication network. The communication network may be a wired or wireless communication system, or a combination of both, and includes the wireless network on which wireless device 200 operates.

Network device 300 includes a processor component 302 for carrying out processing functions associated with one or more of components and functions described herein. Processor component 302 can include a single or multiple sets of processors or multi-core processors. Moreover, processor component 302 can be implemented as an integrated processing system and/or a distributed processing system.

Network device 300 further includes a memory 304, such as for storing local versions of applications being executed by processor component 300. Memory 304 can include random access memory (RAM), read only memory (ROM), and a combination thereof. Optionally, in some aspects, memory 304 includes the data collected in association with the operation of wireless device, such as date session tracking-related data 62, or provisioning information, such as application profiles 28, profile data 26 and the like.

Further, network device 300 includes a communications component 306 that provides for establishing and maintaining communications with one or more parties utilizing hardware, software, and services as described herein. Communications component 306 may carry communications between components on network device 30, as well as between network device 306 and external devices, such as wireless communication device 200, and including devices located across wireless communications network, wired networks and/or broadcast networks and/or devices serially or locally connected to network device 300. In one aspect, communications component 306 is operable for communicating broadcast services, such as overhead broadcast services, including primary messages, notifications messages and the like.

Additionally, network device 300 may further include database 308, which can be any suitable combination of hardware and/or software that provides for mass storage of information, databases, and programs employed in connection with aspects described herein. In certain aspects, database 308 may store the notification messages, primary messages, notification versions and the like.

Network device 300 may additionally include a user interface component 310 operable to receive inputs from a user of network device 300, and to generate outputs for presentation to the user. User interface component 310 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 310 may include one or more output devices, including but not limited to a display, a speaker, a haptic feedback mechanism, a printer, any other mechanism capable of presenting an output to a user, or any combination thereof.

Figure 15:
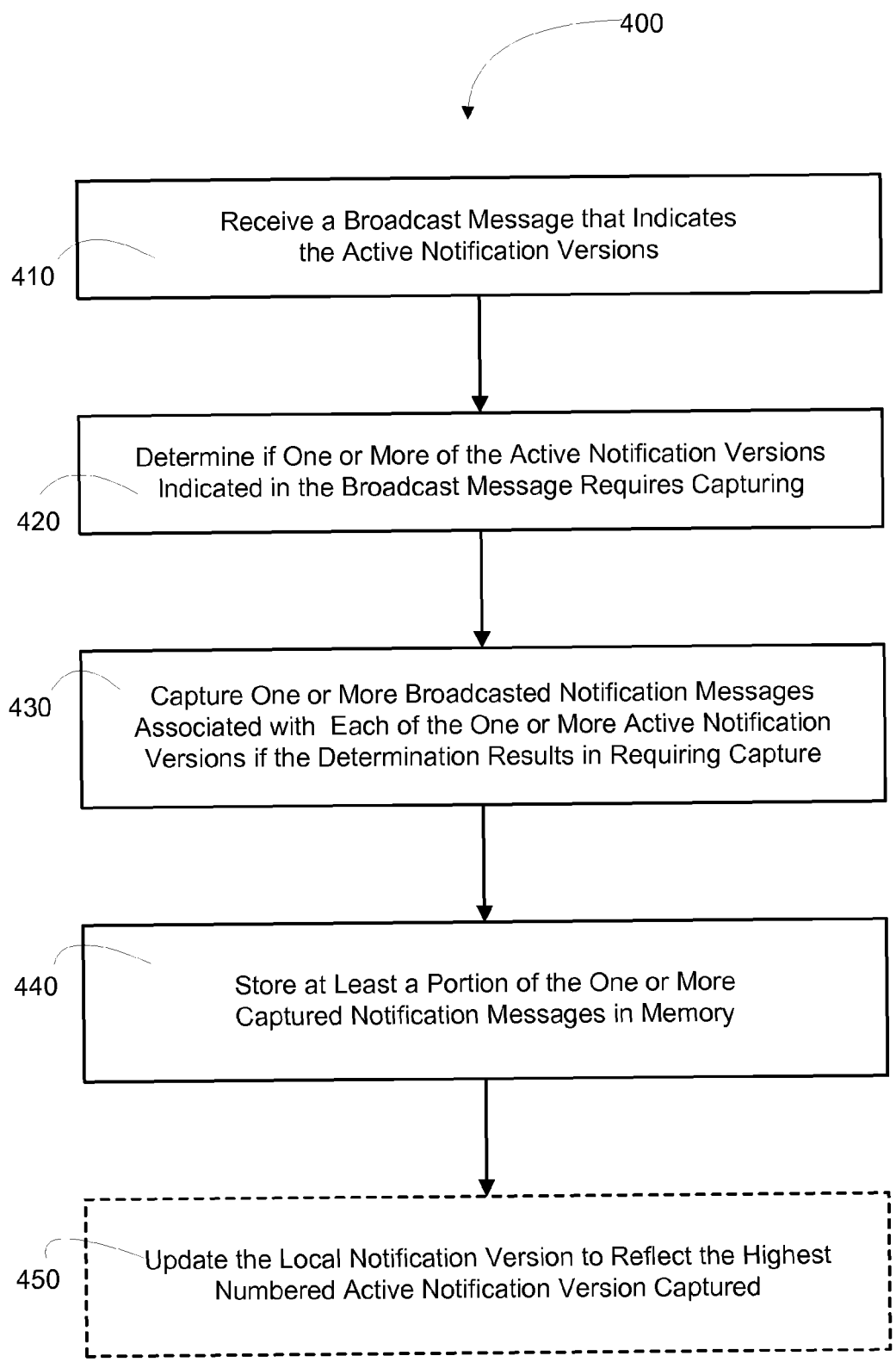
FIG. 15 is a flow diagram depiction of a method for capturing the broadcast of messages indicating active notification versions and capturing and storing notification messages associated with versions requiring capture, according to an aspect.

Turning to FIG. 15, a flow diagram is depicted of a method 400 for receiving broadcast notifications in an overhead service of a broadcast network, according to an aspect. At Event 410, a broadcast message is received that indicates the active notification versions. In one aspect, the broadcast message is a primary message that is broadcasted across a primary channel of an overhead service within the broadcast network. In certain aspects, the broadcast message includes a bit map vector, in which bits in the bit map vector represent notification versions and bits that are set represent the active notification versions.

At Event 420, a determination is performed to determine if one or more of the active notification versions indicated in the broadcast message require capturing by the broadcast-receiving device. In one aspect, the determination may include comparing a local notification version (e.g., the highest numbered version currently associated with the broadcast-receiving device) to the active notification versions indicated in the broadcast message. Version comparison may include comparing the local notification version number to the active notification version numbers to determine if any of the active notification version numbers are higher than the local notification version number. If any of the active notification version numbers are determined to be higher than the local notification version number, then the higher numbered active notification versions are determined to be active notification version(s) requiring capture.

If the determination results in one or more active notification versions requiring capture, then at Event 430, the one or more notification messages associated with the active notification version(s) requiring capture are captured. In one aspect capturing the notification messages may entail tuning the broadcast-receiving device to a notification channel and capturing all of the notification messages associated with the one or more active notification versions requiring capture. The broadcast-receiving device may further determine the number of notifications associated with an active notification version based on an identifier in each of the notification messages. In this regard, the broadcast-receiving device is aware of the overall length or duration of the active notification version and can appropriately stop listening to the notification channel at the end of the active notification version.

At Event 440, at least a portion of the captured notification messages are stored in either local broadcast-receiving device memory, network memory or both. At Event 450 the local notification version is updated to reflect the highest numbered active notification version captured. If the broadcast-receiving device 112 is unable to capture all of the active notification versions requiring capture or any of the notifications within an active notification version requiring capture, then the local notification 138 the local notification version remains the same as before the capture process to insure that the active notifications requiring capture are captured in subsequent broadcasts.

Figure 16:
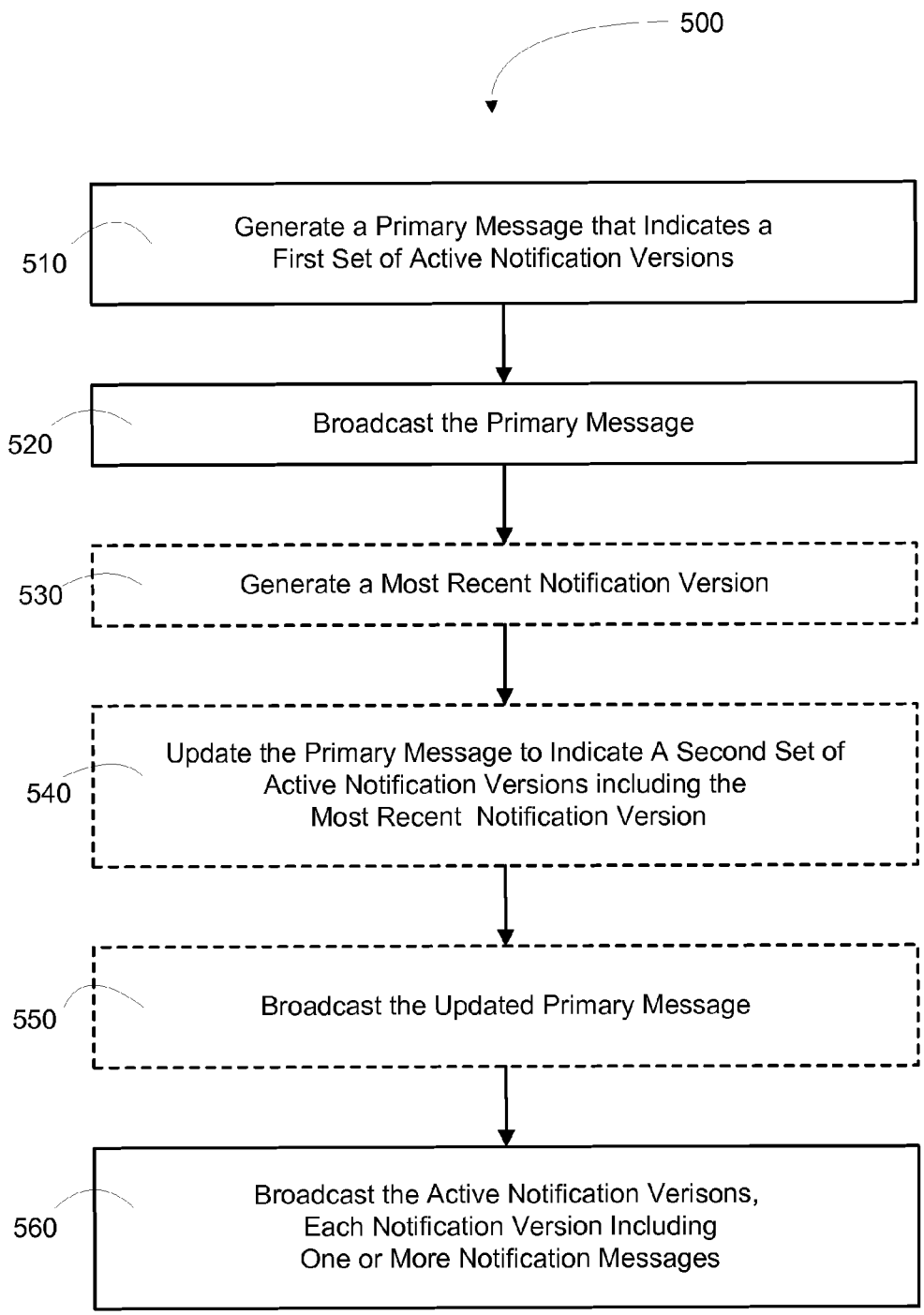
FIG. 16 is a flow diagram illustrating a method for generating and broadcasting a primary message that indicates active notification versions and the active notification versions that include notification messages, according to an aspect.

Referring to FIG. 16, a flow diagram is depicted of a method 500 for generating and broadcasting overhead notifications in a broadcast network, according to a further aspect. At Event 510, a primary message is generated that indicates a first set of active notification versions. In one aspect, active notification versions are indicated in the primary message by inclusion of a bit map vector. The bit map vector maps bits to notification versions and bits that are set in the vector may be mapped to active notification versions. In those aspects which implement a bit map vector to indicate active notification versions, merging of notification messages from an older active notification version to the most recent notification version may be necessary if the range of versions associated with the corresponding bits of the bit map vector will not accommodate the older active notification version in the bit map vector.

At Event 520, the primary message is broadcasted to the broadcast-receiving devices. In some aspects, the primary message may be broadcasted across a designated primary channel.

At optional Event 530, new notifications requiring broadcasting dictate generation of a most recent active notification version that includes the new notifications. At optional Event 540, the primary message is updated to indicate a second set of active notification versions including the most recent active notification version. At optional Event 550, the updated primary message is broadcasted to the broadcast-receiving devices At Event 560, the active notification versions are broadcasted to the broadcast-receiving devices. The active notification versions including one or more notification messages. In one aspect, the active notification versions are broadcasted across a dedicated notification channel. The notification messages may optionally be configured to include a field of indicating the number of notifications in the corresponding notification version. In one aspect, the rate at which an active notification version is broadcasted may vary depending on the age of the version or other factors. Thus, in one aspect, more recent notification versions may be broadcasted more frequently, while less recent/older notification versions are broadcasted less frequently.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Thus, methods, apparatus, systems and computer program products are defined for enhancing the delivery of overhead notifications in a broadcast network, in particular a broadcast network suitable for wireless device implementation. In accordance with present aspects, the broadcast-receiving devices only receive new notification messages, as opposed to receiving all of the currently active notification messages. This is achieved by broadcasting a listing of the currently active notifications versions and having the devices compare the currently active notification versions to the locally stored version(s) to determine which version or versions require capturing. Each notification version may include one or more notification messages. In those aspects in which the broadcast-receiving device is a battery powered wireless device, battery power consumption is minimized because the device only captures active notification messages not currently in device memory, as opposed to all of the currently active notifications.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for acquiring notifications in a broadcast network, the method comprising:
    receiving, in a wireless broadcast, a broadcast message having a bit map vector and an indication of currently active notification versions to determine with of the currently active notification version requires to be received, wherein each bit that is set in the bit map vector maps to a currently active notification version;
    determining whether one or more of the currently active notification versions indicated in the broadcast message requires receiving; and
    receiving, in a wireless broadcast, one or more notification messages associated with each of the one or more currently active notification versions based on the determination that the one or more currently active notification versions are required to be received.

2. The method of claim 1, wherein receiving the broadcast message further comprises listening to a primary channel of a common overhead service within the broadcast network to receive a primary message that indicates the active notification versions.

3. The method of claim 1, wherein receiving the broadcast message that includes the bit map vector further comprises receiving the broadcast message that includes the bit map vector, wherein each set bit in the bit map vector maps to an active notification version.

4. The method of claim 1, wherein determining if one or more of the active notification versions requires receiving further comprises comparing a local version identifier to identifiers associated with the active notification versions.

5. The method of claim 4, wherein comparing a local version identifier to identifiers associated with the active notification versions further comprises comparing a local version number to numbers associated with the active notification versions.

6. The method of claim 5, wherein determining if one or more of the active notification versions require receiving further comprises determining if any of the numbers associated with the active notification versions are higher than the local version number.

7. The method of claim 5, further comprising updating the local version identifier to reflect an identifier associated with a highest sequenced active notification version determined to require capture.

8. The method of claim 7, wherein updating the local version identifier further comprises updating the local version identifier after all of the active notification versions determined to require reception have been received.

9. The method of claim 1, wherein receiving one or more notification messages associated with each of the one or more active notification versions further comprises tuning to a notification channel to receive the one or more notification messages associated with each of the one or more active notification versions determined to require receiving.

10. The method of claim 1, wherein receiving one or more notification messages associated with each of the one or more currently active notification versions further comprises determining the number of notification messages in an active notification version based on an indicator in the notification message.

11. The method of claim 1, wherein receiving one or more notification messages further comprises re-initiating reception of the one or more notification messages following an interruption of the reception, wherein only the currently active notification versions not received in total prior to the interruption require to be received after re-initiating the reception.

12. At least one processor configured to acquire notifications in a broadcast network, the processor comprising:
    a first module for receiving, in a wireless broadcast, a broadcast message having a bit map vector and an indication of currently active notification versions to determine which of the currently active notification version requires to be received wherein each bit that is set in the bit map vector maps to a currently active notification version;
    a second module for determining whether one or more of the currently active notification versions indicated in the broadcast message requires receiving; and
    a third module for receiving, in a wireless broadcast, one or more notification messages associated with each of the one or more currently active notification versions based on the determination that the one or more currently active notification versions are required to be received.

13. A computer program product, comprising:
    a computer-readable medium having stored thereon processor-executable instructions configured to cause a processor to perform operations comprising:
        receiving, in a wireless broadcast, a broadcast message having a bit map vector and an indication of currently active notification versions to determine which of the currently active notification versions requires to be received, wherein each bit that is set in the bit map vector maps to a currently active notification version;
        determining whether one or more of the currently active notification versions indicated in the broadcast message requires receiving; and
        receiving, in a wireless broadcast, one or more notification messages associated with each of the one or more currently active notification versions based on the determination that the one or more currently active notification versions are required to be received.

14. An apparatus, comprising:
- means for receiving, in a wireless broadcast, a broadcast message having a bit map vector and an indication of currently active notification versions to determine which of the currently active notification versions requires to be received, wherein each bit that is set in the bit map vector maps to a currently active notification version;
- means for determining whether one or more of the currently active notification versions indicated in the broadcast message requires receiving; and
- means for receiving, in a wireless broadcast, one or more notification messages associated with each of the one or more currently active notification versions based on the determination that the one or more currently active notification versions are required to be received.

15. An apparatus, comprising:
- a computer platform including a processor and memory in communication with the processor;
- one or more local notification versions stored in the memory, wherein each local notification version comprises one or more notification messages;
- a broadcast network module stored in the memory and in communication with the processor, wherein the module is operable to receive, in a wireless broadcast, a broadcast message having a bit map vector and an indication of currently active notification versions to determine which of the currently active notification versions requires to be received, wherein each bit that is set in the bit map vector maps to a currently active notification version; and
- notification version comparison logic stored in the memory and in communication with the processor,
- wherein the notification version comparison logic is operable to determine whether one or more of the currently active notification versions indicated in the broadcast message requires receiving,
- wherein the broadcast network module is further operable to receive, in a wireless broadcast, and store in the memory one or more notifications messages associated with each of the one or more currently active notification versions based on the determination that the one or more currently active notification versions are required to be received.

16. The apparatus of claim 15, wherein the broadcast network module is further operable to periodically tune to a primary channel of a common overhead service to listen for a primary broadcast message that indicates the active notification versions.

17. The apparatus of claim 15, wherein the broadcast network module is further operable to receive the broadcast message that includes the bit map vector, wherein each set bit in the bit map vector maps to an active notification version.

18. The apparatus of claim 15, wherein the broadcast network module comprises the notification version comparison logic.

19. The apparatus of claim 15, wherein the notification version comparison logic is further operable to compare identifiers associated with the one or more local notification versions to identifiers associated with the active notification versions indicated in the broadcast message.

20. The apparatus of claim 19, wherein the notification version comparison logic is further operable to compare a highest numbered local notification version with numbers associated with the active notification versions indicated in the broadcast message.

21. The apparatus of claim 20, wherein the notification version comparison logic is further operable to determine if any of the numbers associated with the active notification versions indicated in the broadcast message are higher than the highest numbered local notification version.

22. The apparatus of claim 19, further comprising a local version management module operable to update the local version identifier to reflect an identifier associated with a highest sequenced active notification version determined to require capture.

23. The apparatus of claim 22, wherein the local version management module is further operable to update the local version identifier after all of the active notification versions determined to require reception have been received.

24. The apparatus of claim 15, wherein the broadcast network module is further operable to tune to a notification channel to receive the one or more notifications associated with each of the one or more active notification versions determined to require receiving.

25. The apparatus of claim 15, wherein the broadcast network module is further operable to determine the number of notifications in an active notification version determined to require receiving based on an indicator in the notification message.

26. A method for generation and communication of notification messages in a broadcast network, the method comprising:
- generating a primary message having a bit map vector and an indication of a first set of active notification version, wherein each bit that is set in the bit map vector maps to a currently active notification version;
- broadcasting the primary message across a primary channel; and
- broadcasting the first set of active notification versions across a notification channel, wherein each notification version includes one or more notification messages.

27. The method of claim 26, wherein generating the primary message that includes the bit map vector further comprising setting a bit in the bit map vector to indicate each of the active notification versions.

28. The method of claim 26, further comprising merging notification messages associated with a first active notification version into a most current notification version if a version identifier associated with the first active notification version is not capable of being indicated in the bit map vector due to bit map size limitations.

29. The method of claim 26, further comprising generating a most current notification version.

30. The method of claim 29, wherein generating the primary message further comprises generating the primary message that indicates a second set of active notification versions including the most current notification version.

31. The method of claim 30, wherein generating the primary message further comprises generating the primary message that includes a bit map vector, wherein each bit in the bit map vector maps to a notification version, each set bit in the bit map vector maps to an active notification version and a most significant bit in the bit map vector is set to indicate that the most current notification version is an active notification version.

32. The method of claim 29, further comprising broadcasting the second set of active notification versions across the notification channel in place of the first set of active notifications.

33. The method of claim 26, wherein broadcasting the first set of active notification versions across a notification channel further comprises broadcasting the first set of active notification versions, each version including one or more notification messages, wherein each notification message indicates the number of notifications in the corresponding notification version.

34. The method of claim 26, wherein broadcasting the first set of active notification versions further comprises varying a rate at which each active notification version is broadcasted relative to an age of each active notification version.

35. The method of claim 26, wherein broadcasting the active notification versions further comprises broadcasting later-in-time active notification versions more frequently than previous-in-time active notification versions.

36. At least one processor configured to generate and communicate notification messages in a broadcast network, the processor comprising:
a first module for generating a primary message having a bit map vector and an indication of a set of active notification version, wherein each bit that is set in the bit map vector maps to a currently active notification version;
a second module for broadcasting the primary message across a primary channel; and
a third module for broadcasting the set of active notification versions across a notification channel, wherein each notification version includes one or more notification messages.

37. A computer program product, comprising:
a computer-readable medium having stored thereon processor-executable instructions configured to cause a processor to perform operations comprising:
generating a primary message having a bit map vector and an indication of a set of active notification version, wherein each bit that is set in the bit map vector maps to a currently active notification version;
broadcasting the primary message across a primary channel; and
at least one instruction for causing the computer to broadcast the set of active notification versions across a notification channel, wherein each notification version includes one or more notification messages.

38. An apparatus, comprising:
means for generating a primary message having a bit map vector and an indication of a set of active notification version, wherein each bit that is set in the bit map vector maps to a currently active notification version;
means for broadcasting the primary message across a primary channel; and
means for broadcasting the set of active notification versions across a notification channel, wherein each notification version includes one or more notification messages.

39. An apparatus, comprising:
a computer platform including a processor and memory in communication with the processor;
a broadcast notification module stored in the memory and in communication with the processor, including a primary message generator operable to generate a primary message having a bit map vector and an indication of a first set of active notification version, wherein each bit that is set in the bit map vector maps to a currently active notification version; and
a broadcast module operable for broadcasting the primary message across a primary channel and for broadcasting the first set of active notification versions across a notification channel, wherein each notification version includes one or more notification messages.

40. The apparatus of claim 39, wherein the primary message generator is further operable to set a bit in the bit map vector to indicate each of the active notification versions.

41. The apparatus of claim 39, wherein the primary message generator is further operable to merge notification messages associated with a first active notification version into a most current notification version if a version identifier associated with the first active notification version is not capable of being indicated in the bit map vector due to bit map size limitations.

42. The apparatus of claim 39, wherein the broadcast notification module further comprises a notification message generator operable to generate notifications, wherein one or more generated notifications provide for a most current notification version.

43. The apparatus of claim 42, wherein the primary message generator is further operable to generate the primary message that indicates a second set of active notification versions including the most current notification version.

44. The apparatus of claim 43, wherein the primary message generator is further operable to generate the primary message that includes a bit map vector, wherein each bit in the bit map vector maps to a notification version, each set bit in the bit map vector maps to an active notification version and a most significant bit is set in the bit map vector to indicate that the most current notification version is an active notification version.

45. The apparatus of claim 39, wherein the broadcast module is further operable to broadcast the active notification versions, each version including one or more notification messages, wherein each notification message indicates the number of notifications in the corresponding notification version.

46. The apparatus of claim 39, wherein the broadcast module is further operable to vary a rate at which each active notification version is broadcasted relative to an age of each active notification version.

47. The apparatus of claim 46, wherein the broadcast module is further operable to broadcast later-in-time active notification versions more frequently than previous-in-time active notification versions.

* * * * *